United States Patent
Bhagwat et al.

(10) Patent No.: US 10,509,593 B2
(45) Date of Patent: Dec. 17, 2019

(54) DATA SERVICES SCHEDULING IN HETEROGENEOUS STORAGE ENVIRONMENTS

(71) Applicant: International Business Machines Corporation, Armonk, NY (US)

(72) Inventors: Deepavali M. Bhagwat, Cupertino, CA (US); Nilesh P. Bhosale, Pune (IN); Joseph W. Dain, Vail, AZ (US); James Hewitt, Eastleigh (GB); Wayne A. Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 15/662,558

(22) Filed: Jul. 28, 2017

(65) Prior Publication Data
US 2019/0034119 A1    Jan. 31, 2019

(51) Int. Cl.
G06F 3/06     (2006.01)
G06F 9/48     (2006.01)
G06F 9/50     (2006.01)

(52) U.S. Cl.
CPC .......... *G06F 3/0659* (2013.01); *G06F 3/061* (2013.01); *G06F 3/067* (2013.01); *G06F 3/0653* (2013.01); *G06F 3/0685* (2013.01); *G06F 9/4881* (2013.01); *G06F 9/505* (2013.01); *G06F 9/5016* (2013.01)

(58) Field of Classification Search
CPC ............................. G06F 3/0659; G06F 3/061
USPC ...................................................... 711/100
See application file for complete search history.

(56) References Cited

U.S. PATENT DOCUMENTS

| | | | |
|---|---|---|---|
| 6,446,175 B1* | 9/2002 | West | G06F 11/1456 711/161 |
| 8,839,254 B2 | 9/2014 | Horvitz et al. | |
| 8,868,776 B2* | 10/2014 | Foygel | H04L 47/10 709/232 |
| 9,454,526 B1 | 9/2016 | Kapoor et al. | |
| 2003/0220860 A1 | 11/2003 | Heytens et al. | |

(Continued)

OTHER PUBLICATIONS

Montes, Jesús, et al., "Using Global Behavior Modeling to Improve QoS in Large-scale Distributed Data Storage Services," Institut National de Recherche en Informatique et Automatique, Feb. 2010.

(Continued)

*Primary Examiner* — Jae U Yu
(74) *Attorney, Agent, or Firm* — Nelson and Nelson; Daniel P. Nelson; Alexis V. Nelson

(57) ABSTRACT

A method for scheduling data services in a heterogeneous storage environment is disclosed. In one embodiment, such a method includes instrumenting, in a heterogeneous storage environment, each of a plurality of storage systems to generate events when operations are performed thereon. The events are detected and indexed in a single namespace. These events may then be analyzed to generate a statistical model of I/O activity occurring in the heterogeneous storage environment over a period of time. From the statistical model, the method determines periods of reduced I/O workload across the heterogeneous storage environment. The method then schedules data services to occur during these periods of reduced I/O workload. A corresponding system and computer program product are also disclosed.

20 Claims, 6 Drawing Sheets

(56) References Cited

U.S. PATENT DOCUMENTS

2013/0185730 A1    7/2013   Baruch et al.
2016/0221592 A1    8/2016   Puttagunta et al.
2016/0292611 A1   10/2016   Boe et al.
2016/0294606 A1   10/2016   Puri et al.

OTHER PUBLICATIONS

Xue, Ji, et al., "Storage Workload Isolation via Tier Warming: How Models Can Help," 11th International Conference on Autonomic Computing (ICAC 14), pp. 1-11, Jun. 2014.

Xue, Ji, et al., "Proactive Management of Systems via Hybrid Analytic Techniques," 2015 International Conference on Cloud and Autonomic Computing (ICCAC), pp. 137-148, IEEE, Sep. 2015.

* cited by examiner

DATA SERVICES SCHEDULING IN HETEROGENEOUS STORAGE ENVIRONMENTS

BACKGROUND

Field of the Invention

This invention relates to systems and methods for scheduling data services in heterogeneous storage environments.

Background of the Invention

Storage networks, such as storage-area-networks (SANs), are network architectures used to connect servers (also referred to herein as "host systems") to storage systems such as disk arrays, tape libraries, and the like. These storage networks are often heterogeneous, meaning that the host systems and storage systems in the network may be manufactured by different vendors and/or use different operating systems or applications. This can present a problem when trying to gather information or statistics about storage systems in the heterogeneous storage environment. Because the storage systems may originate from different vendors and/or use different operating systems or applications, no single tool is likely to be usable across the heterogeneous storage environment to gather statistics from all storage systems therein. This means that a user wishing to obtain capacity information and/or performance statistics from each storage system will probably need to install and learn many different reporting tools, each of which may provide varying levels of detail and provide data in different formats.

In heterogeneous storage environments, it is often very complex to schedule and manage data services across the environment. For example, cold data may need to be migrated from a hot storage tier to a cold storage tier in the same or a different storage system to improve efficiency. When performing the migration, actions may be taken to minimize the impact on production activities. This becomes increasingly difficult in large enterprises with tens of thousands of file systems, large object stores, etc. In some cases, a user may desire to bulk load metadata from an object store into a centralized location. This may require creating a list of all buckets in the object store, which may significantly impact the performance of the object store. With tens of thousands of file systems and/or different storage islands, managing these data services in a seamless end-to-end manner may be very difficult.

In view of the foregoing, what are needed are systems and methods to more efficiently schedule data services in heterogeneous storage environments. Ideally, this will be accomplished in a way that minimizes the impact to I/O performance in the heterogeneous storage environment.

SUMMARY

The invention has been developed in response to the present state of the art and, in particular, in response to the problems and needs in the art that have not yet been fully solved by currently available systems and methods. Accordingly, systems and methods in accordance with the invention have been developed to more efficiently schedule data services in heterogeneous storage environments. The features and advantages of the invention will become more fully apparent from the following description and appended claims, or may be learned by practice of the invention as set forth hereinafter.

Consistent with the foregoing, a method for scheduling data services in a heterogeneous storage environment is disclosed. In one embodiment, such a method includes instrumenting, in a heterogeneous storage environment, each of a plurality of storage systems to generate events when operations are performed thereon. The events are detected and indexed in a single namespace. These events may then be analyzed to generate a statistical model of I/O activity occurring in the heterogeneous storage environment over a period of time. From the statistical model, the method determines periods of reduced I/O workload across the heterogeneous storage environment. The method then schedules data services to occur during these periods of reduced I/O workload.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
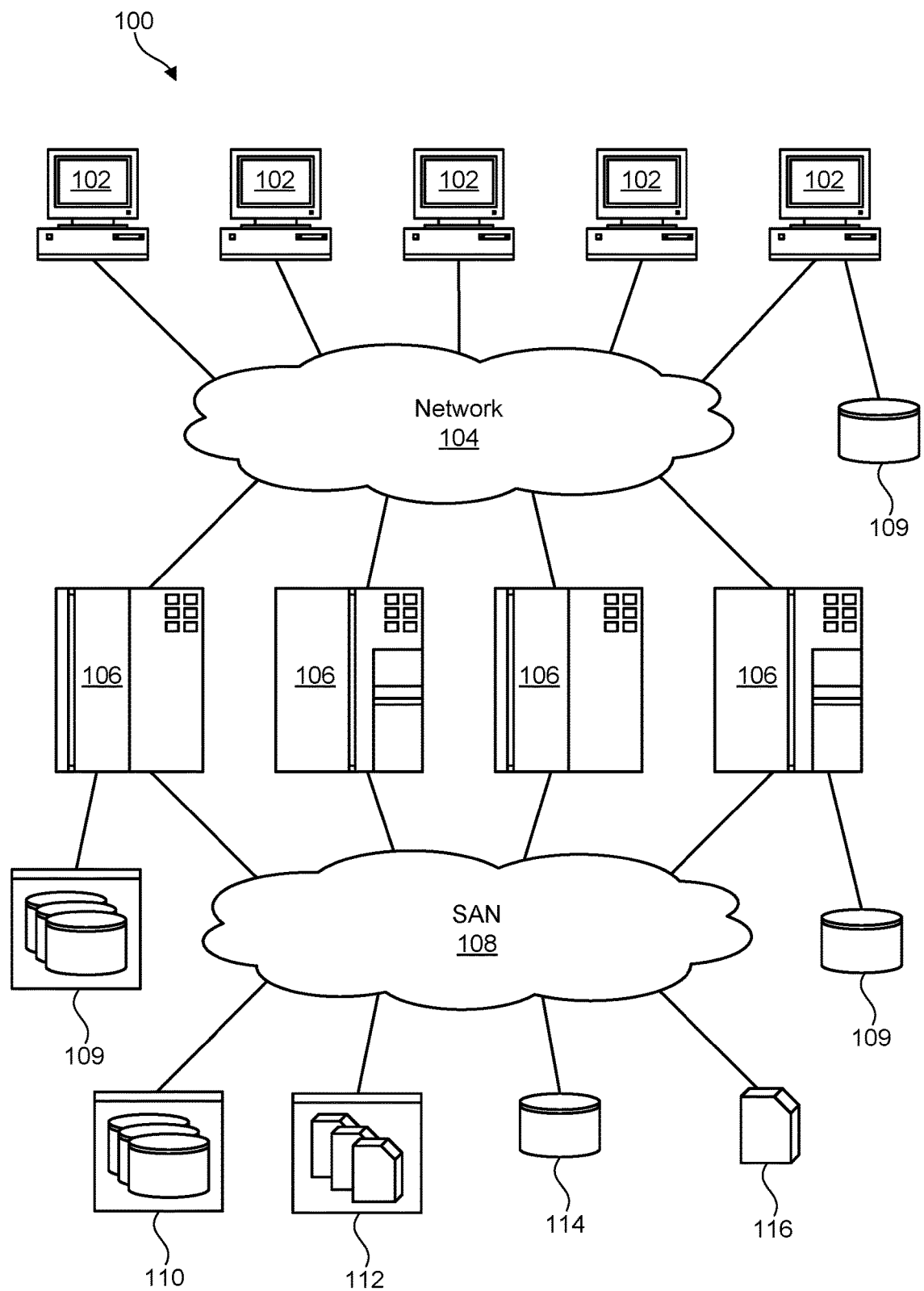
FIG. 1 is a high-level block diagram showing one example of a heterogeneous storage environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 109 (e.g., arrays of hard-disk drives, solid-state drives, tape drives, etc.). These computers 102, 106 and direct-attached storage systems 109 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 112, individual hard-disk drives 114 or solid-state drives 114, tape drives 116, CD-ROM libraries, or the like. The storage systems 110, 112, 114, 116 may be part of a heterogeneous storage environment. To access a storage system 110, 112, 114, 116, a host system 106 may communicate over physical connections from one or more ports on the host 106 to one or more ports on the storage system 110, 112, 114, 116. A connection may be through a switch, fabric, direct connection, or the like. In certain embodiments, the servers 106 and storage systems 110, 112, 114, 116 may communicate using a networking standard such as Fibre Channel (FC).

Figure 2:
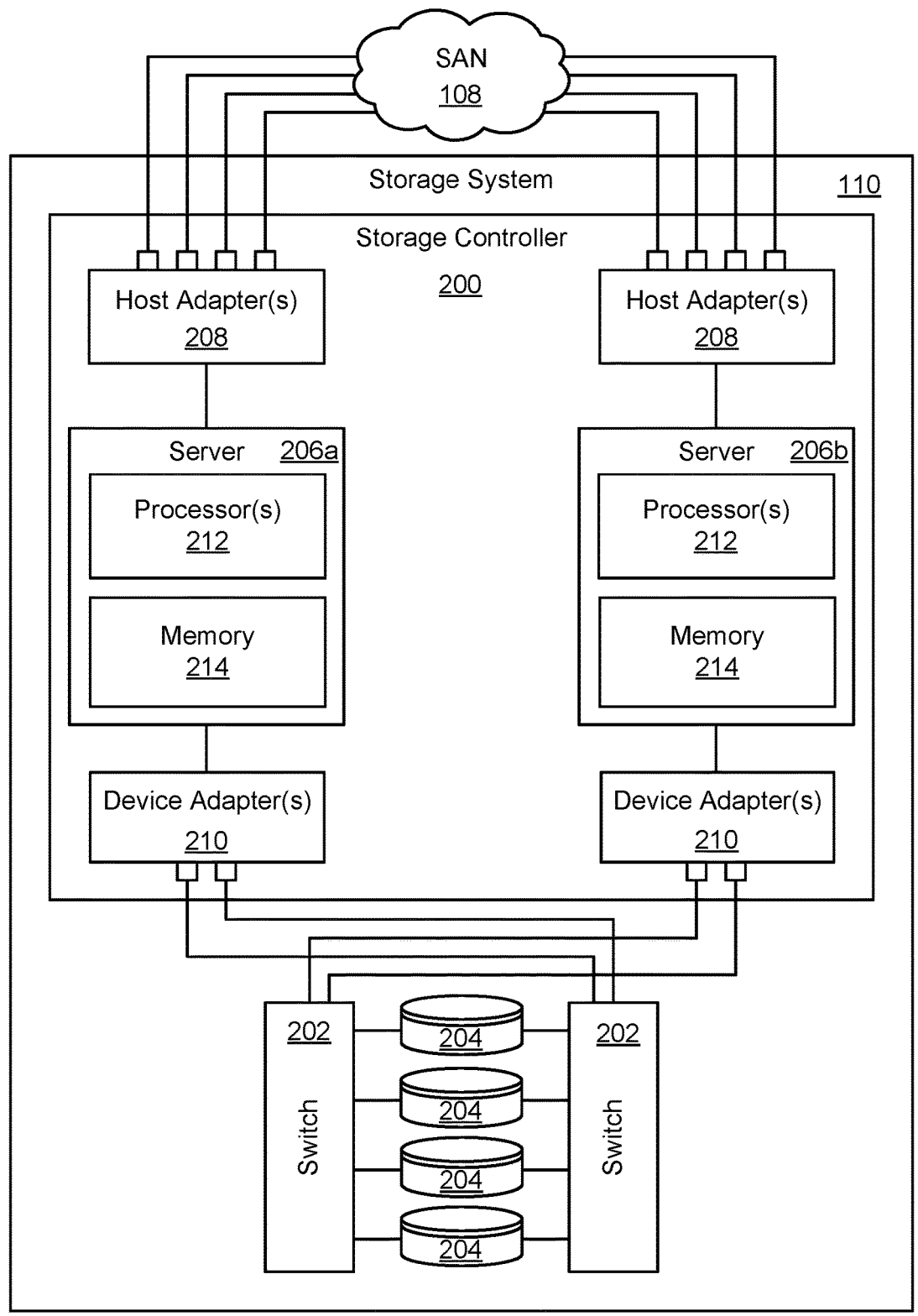
FIG. 2 is a high-level block diagram showing one example of a storage system in a heterogeneous storage environment.

Referring to FIG. 2, one embodiment of a storage system 110 containing an array of hard-disk drives 204 and/or solid-state drives 204 is illustrated. Such a storage system 110 may be included in a heterogeneous storage environment. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
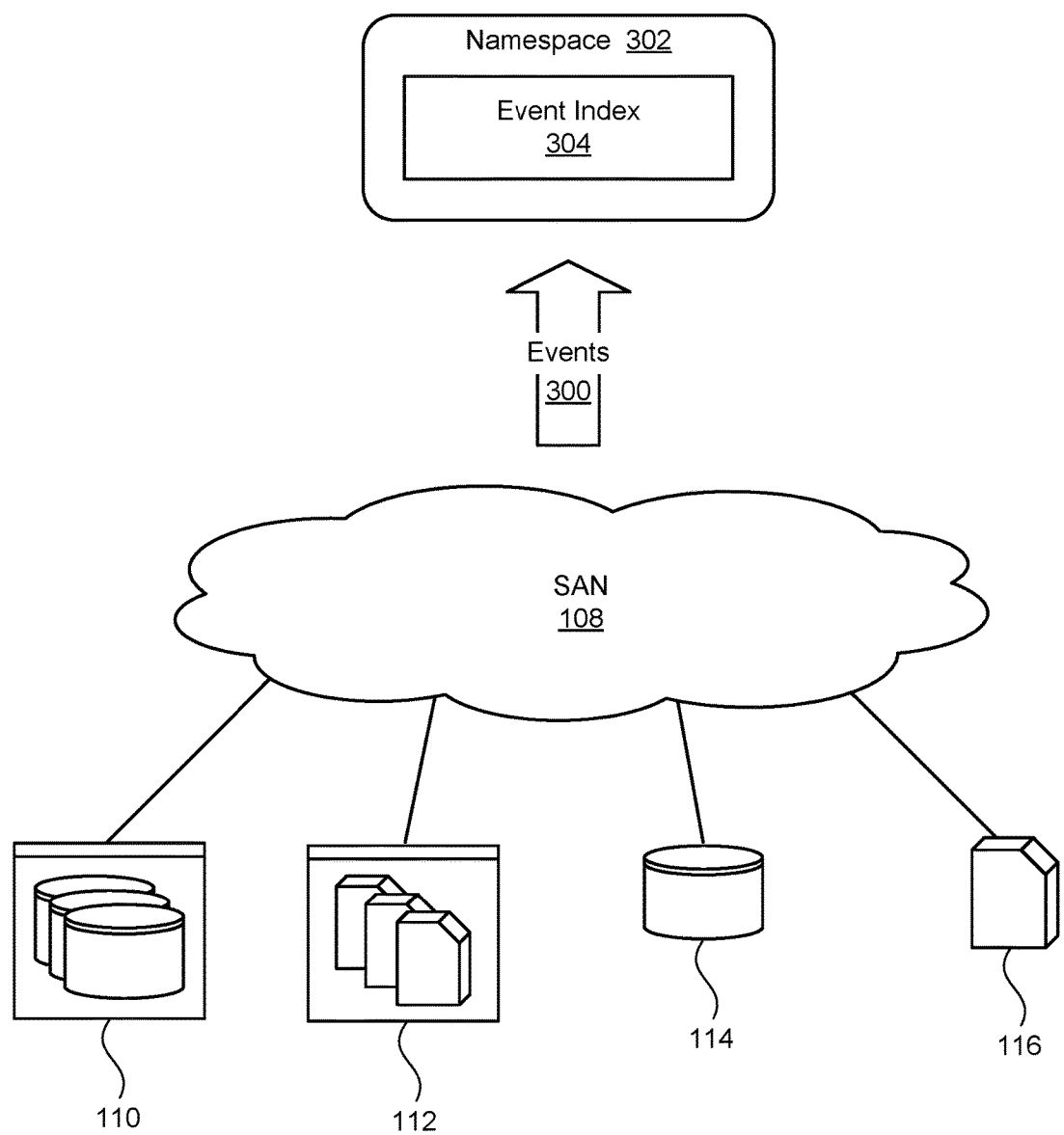
FIG. 3 is a high-level block diagram showing how storage systems in the heterogeneous storage environment may be instrumented to generate live events when operations are performed thereon.

Referring to FIG. 3, as previously mentioned, storage networks, such as storage-area-networks 108 (SANs), are network architectures used to connect servers 106 (also referred to herein as host systems 106) to storage systems 110, 112, 114, 116 such as disk arrays 110, tape libraries 112, and the like. These storage networks 108 are often heterogeneous, meaning that the host systems 106 and storage systems 110, 112, 114, 116 in the network may be manufactured by different vendors and/or use different operating systems or applications. This can present a problem when trying to gather information or statistics about storage systems 110, 112, 114, 116 in the heterogeneous storage environment. Because the storage systems 110, 112, 114, 116 may originate from different vendors and/or use different operating systems or applications, no single tool is likely to be usable across the heterogeneous storage environment to gather statistics from all storage systems 110, 112, 114, 116 in the environment. This means that a user wishing to obtain capacity information and/or performance statistics from each storage system will probably need to install and learn many different reporting tools, each of which may provide varying levels of detail and provide data in different formats.

In heterogeneous storage environments, it is often very complex to schedule and manage data services across the environment. For example, cold data may need to be migrated from a hot storage tier to a cold storage tier in the same or a different storage system 110, 112, 114, 116 to improve efficiency. When performing the migration, actions may be taken to minimize the impact on production activities. This becomes increasingly difficult in large enterprises with tens of thousands of file systems, large object stores, etc. In some cases, a user may desire to bulk load metadata from an object store into a centralized location. This may require creating a list of all buckets in the object store, which may significantly impact the performance of the object store. With tens of thousands of file systems and/or different storage islands, managing these data services in a seamless end-to-end manner may be very difficult.

Thus, systems and methods are needed to more efficiently schedule data services in heterogeneous storage environments. Ideally, this may be accomplished without impacting I/O performance in the heterogeneous storage environment or only minimally impacting I/O performance.

In certain embodiments in accordance with the invention, storage systems 110, 112, 114, 116 in a heterogeneous storage environment may be instrumented to generate events 300 (e.g., live events 300) when operations (e.g., read operations, write operations, etc.) are performed thereon. These events 300 may be detected and used to create an event index 304 in a single namespace 302. The events 300 in this event index 304 may then be analyzed to generate a statistical model of I/O activity occurring in the heterogeneous storage environment, both for each storage system in the heterogeneous storage environment as well as the heterogeneous storage environment as a whole, over a selected period of time. From this statistical model, periods of reduced I/O workload may be determined across the heterogeneous storage environment for each storage system individually and/or the storage systems 110, 112, 114, 116 collectively. Data services may then be scheduled to occur during these periods of reduced I/O workload. These data services may include, for example, bulk loading of storage system metadata, migration of data between different storage tiers, migration of data between different storage systems 110, 112, 114, 116, and performing deep inspection of data residing on the storage systems 110, 112, 114, 116.

Figure 4:
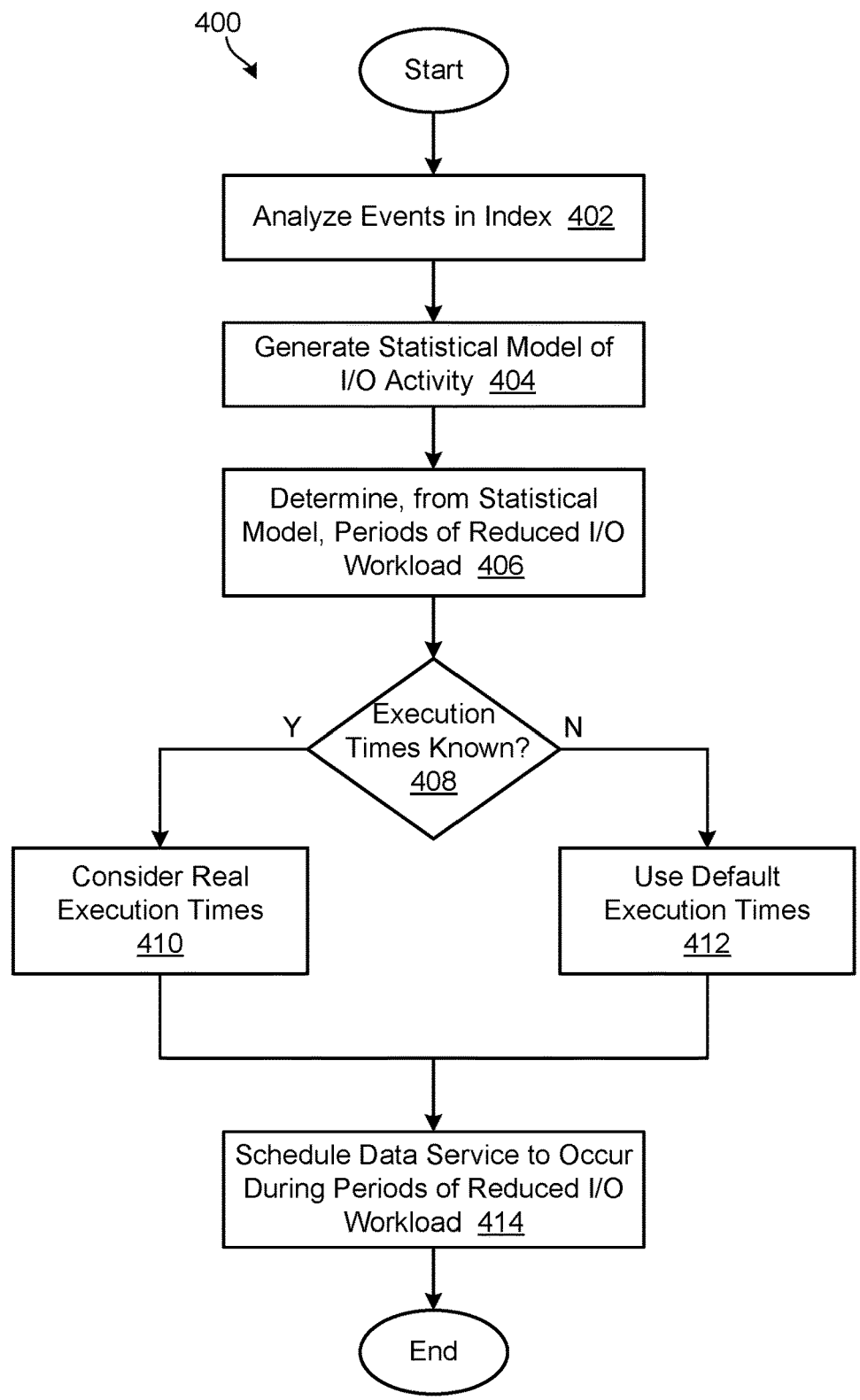
FIG. 4 is a high-level block diagram showing one embodiment of a method for scheduling data services in the heterogeneous storage environment.

Referring to FIG. 4, one embodiment of a method 400 for scheduling data services in a heterogeneous storage environment is illustrated. As shown, the method 400 initially analyzes 402 events 300 in the event index 304. From this analysis, the method 400 generates 404 a statistical model of I/O activity in the heterogeneous storage environment over a period of time (days, weeks, months, etc.). The method 400 then determines 406, from the statistical model, periods of reduced I/O workload in the heterogeneous storage environment. This may include determining periods of reduced I/O workload for the storage systems 110, 112, 114, 116 individually or as a whole, and/or for storage systems 110, 112, 114, 116 that will be affected by a particular data service.

The method 400 may then determine 408 whether the execution time of a data service to be executed is known. If so, the method 400 considers 410 actual observed execution times of the data service in a specific heterogeneous storage environment and/or on specific storage systems 110, 112, 114, 116 and the method 400 schedules 414 the data service to execute during the period(s) of reduced I/O workload. As can be appreciated, the observed execution time of a data service may affect when the data service is scheduled to start and/or end. If the actual execution time of a data service is not known, the method 400 may use 412 a default execution time that represents an educated guess of how long it will take the data service to complete. In certain embodiments, a default execution time for a particular data service such as a data migration service may be calculated from normalized throughput rates derived from the event index 304 for specific storage systems 110, 112, 114, 116 on which the migration will occur. The method 400 may then schedule 414 the data service to execute during a period of reduced I/O workload in accordance with the default execution time. The execution time may then be observed to update the default execution time with an actual execution time for futures runs of the data service.

For example, a data service that bulk loads metadata for one million objects in an object storage system may have a default execution time of ten minutes. After running in a specific heterogeneous storage environment, it may be observed that the bulk load data service takes twenty minutes to execute. A scheduler may then be updated to utilize the twenty minute execution time. This execution time may be factored into data service scheduler algorithms. In certain embodiments, actual execution times may be aggregated across multiple heterogeneous storage environments and leveraged to fine tune default execution times for new deployments, thus providing not only machine learning tailored for a specific heterogeneous storage environment, but also improving accuracy for other heterogeneous storage environments as well.

Figure 5:
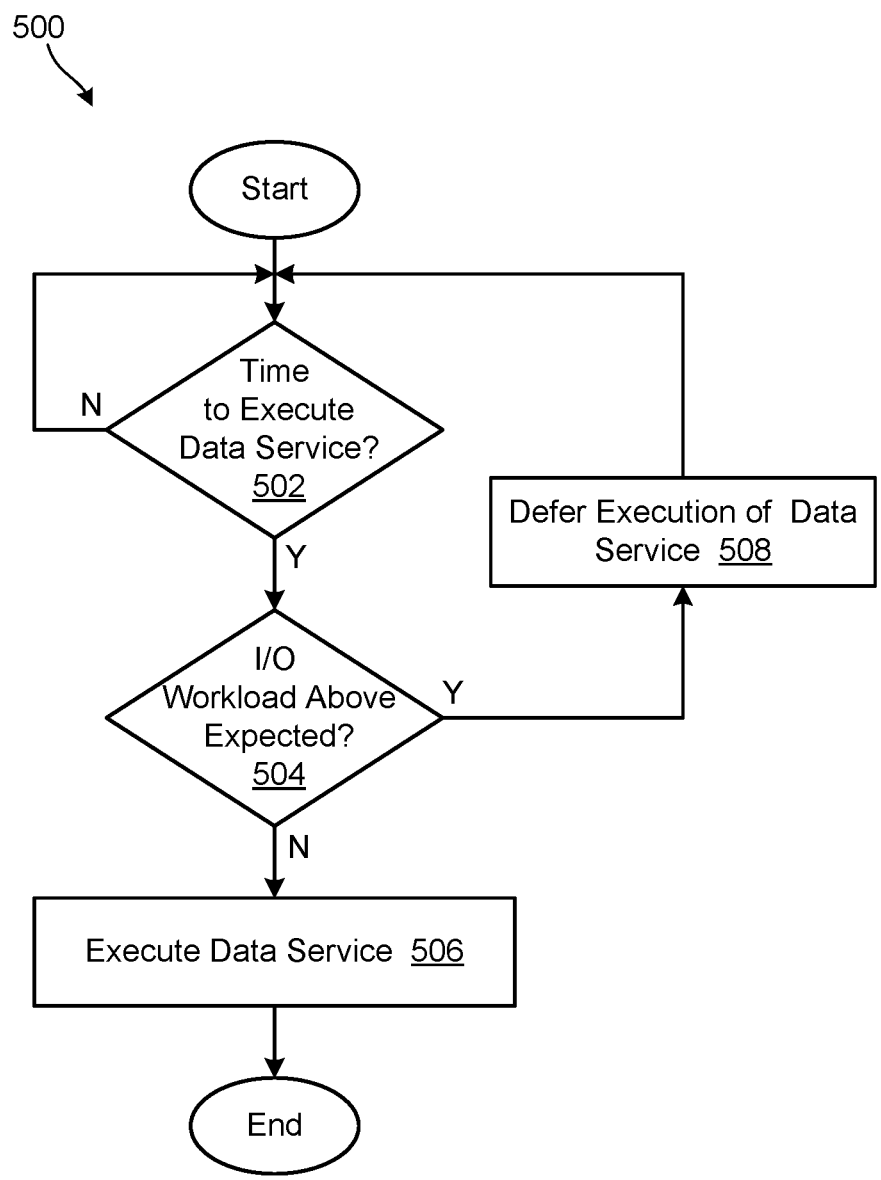
FIG. 5 is a high-level block diagram showing one embodiment of a method for executing, or alternatively deferring execution, of a data service.

Referring to FIG. 5, one embodiment of a method 500 for executing, or deferring execution, of a data service is illustrated. As shown, the method 500 initially determines 502 whether it is time to execute a particular data service. If so, the method 500 determines 504 whether the I/O workload of a storage system is above what is expected (i.e., varies from what is expected in the statistical model, such as if an unknown production application unexpectedly executes during a period of normally reduced I/O workload). If the I/O workload is not above what is expected (as determined by comparing the I/O workload to a threshold), the method 500 executes 506 the data service.

If, on the other hand, the I/O workload is above the threshold, the method 500 may defer 508 execution of the data service. In certain embodiments, this deferral may occur until the next period of reduced I/O workload. For example, if a data service is scheduled to occur during a weekend but I/O activity is more than expected during the weekend, the data service may be deferred and scheduled for execution on the next weekend. In other embodiments, the data service is simply deferred until the next period of reduced I/O workload, such as when I/O activity falls below a selected threshold. In certain embodiments, systems and methods in accordance with the invention may consider the I/O workload of both a source storage system and a destination storage system, particularly if a data service is moving data between storage systems.

Figure 6:
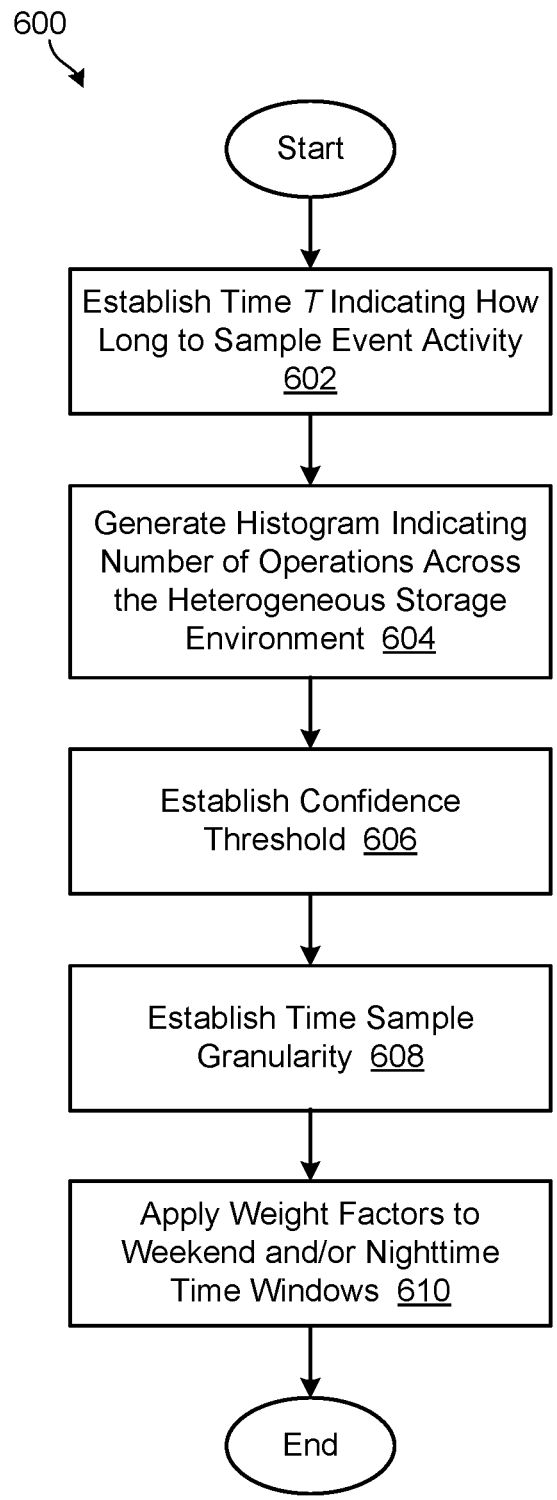
FIG. 6 is a high-level block diagram showing one embodiment of a method for generating a statistical model of I/O activity in the heterogeneous storage environment.

Referring to FIG. 6, a method 600 for generating a statistical model of I/O activity in a heterogeneous storage environment is illustrated. This method 600 may roughly correspond to step 404 of FIG. 4. As shown, the method 600 may initially establish a time T indicating how long to sample event activity in the heterogeneous storage environment. The longer the time T, the more accurate the learning may be. For example, setting T to fourteen days provides two weeks of data to analyze and detect utilization patterns.

Once event activity is sampled for time T, the method 600 generates 604 a histogram indicating the frequency of operations over various time intervals across the heterogeneous storage environment. The method 600 may further establish 608 a confidence threshold that indicates a number of samples to line up before making an educated guess that a time window or interval has low utilization (i.e., reduced I/O workload). The method 600 may also enable 608 time sample granularity to be set 608 (e.g., fifteen minute increments, one hour increments, etc.). For example, if a confidence threshold of three and a time sample granularity of fifteen minutes is established at steps 606 and 608, the method 400 illustrated in FIG. 4 may determine 406 that the time period from 3 A.M. to 3:15 A.M. for three work days in a row is relatively idle. In certain embodiments, the method 600 may take into account the fact that batch windows and weekend processing are quite typical in heterogeneous storage environments and may assign 610 weight factors to nighttime and weekend batch processing windows compared to regular working-hour windows.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for scheduling data services in a heterogeneous storage environment, the method comprising:
instrumenting, in a heterogeneous storage environment comprising a plurality of storage systems, each of the storage systems to generate events when operations are performed thereon;
detecting the events from the plurality of storage systems and indexing the events in a single namespace;

analyzing the events in the namespace to generate a statistical model that describes I/O activity occurring in the heterogeneous storage environment over a period of time;

determining, from the statistical model, periods of reduced I/O workload across the heterogeneous storage environment as a whole; and scheduling data services to occur in the heterogeneous storage environment during the periods of reduced I/O workload.

2. The method of claim 1, wherein the data services comprise at least one of: bulk loading of storage system metadata, migration of data between different storage tiers, migration of data between different storage systems, and performing deep inspection of data residing on the storage systems.

3. The method of claim 1, wherein scheduling the data services further comprises taking into account execution times of the data services.

4. The method of claim 3, wherein the execution times are based on actual observed execution times of the data services.

5. The method of claim 3, wherein the execution times are default execution times.

6. The method of claim 1, wherein scheduling the data services further comprises deferring execution of the data services in the event unexpected activities occur during the periods of reduced I/O workload in which the data services are scheduled.

7. The method of claim 1, wherein the period of time is configurable by a user.

8. A computer program product for scheduling data services in a heterogeneous storage environment, the computer program product comprising a non-transitory computer-readable storage medium having computer-usable program code embodied therein, the computer-usable program code configured to perform the following when executed by at least one processor:

instrument, in a heterogeneous storage environment comprising a plurality of storage systems, each of the storage systems to generate events when operations are performed thereon;

detect the events from the plurality of storage systems and index the events in a single namespace;

analyze the events in the namespace to generate a statistical model that describes I/O activity occurring in the heterogeneous storage environment over a period of time;

determine, from the statistical model, periods of reduced I/O workload across the heterogeneous storage environment as a whole; and schedule data services to occur in the heterogeneous storage environment during the periods of reduced I/O workload.

9. The computer program product of claim 8, wherein the data services comprise at least one of: bulk loading of storage system metadata, migration of data between different storage tiers, migration of data between different storage systems, and performing deep inspection of data residing on the storage systems.

10. The computer program product of claim 8, wherein scheduling the data services further comprises taking into account execution times of the data services.

11. The computer program product of claim 10, wherein the execution times are based on actual observed execution times of the data services.

12. The computer program product of claim 10, wherein the execution times are default execution times.

13. The computer program product of claim 8, wherein scheduling the data services further comprises deferring execution of the data services in the event unexpected activities occur during the periods of reduced I/O workload in which the data services are scheduled.

14. The computer program product of claim 8, wherein the period of time is configurable by a user.

15. A system for scheduling data services in a heterogeneous storage environment, the system comprising:

at least one processor;

at least one memory device operably coupled to the at least one processor and storing instructions for execution on the at least one processor, the instructions causing the at least one processor to:

instrument, in a heterogeneous storage environment comprising a plurality of storage systems, each of the storage systems to generate events when operations are performed thereon;

detect the events from the plurality of storage systems and index the events in a single namespace;

analyze the events in the namespace to generate a statistical model that describes I/O activity occurring in the heterogeneous storage environment over a period of time;

determine, from the statistical model, periods of reduced I/O workload across the heterogeneous storage environment as a whole; and schedule data services to occur in the heterogeneous storage environment during the periods of reduced I/O workload.

16. The system of claim 15, wherein the data services comprise at least one of: bulk loading of storage system metadata, migration of data between different storage tiers, migration of data between different storage systems, and performing deep inspection of data residing on the storage systems.

17. The system of claim 15, wherein scheduling the data services further comprises taking into account execution times of the data services.

18. The system of claim 17, wherein the execution times are based on actual observed execution times of the data services.

19. The system of claim 15, wherein scheduling the data services further comprises deferring execution of the data services in the event unexpected activities occur during the periods of reduced I/O workload in which the data services are scheduled.

20. The system of claim 15, wherein the period of time is configurable by a user.

* * * * *